(12) United States Patent
Ramaiah et al.

(10) Patent No.: US 11,910,763 B2
(45) Date of Patent: Feb. 27, 2024

(54) LIGHT SOURCE SYSTEM FOR HORTICULTURE APPLICATIONS

(71) Applicant: CURRENT LIGHTING SOLUTIONS, LLC, Beachwood, OH (US)

(72) Inventors: Raghu Ramaiah, Beachwood, OH (US); Mark Kaminski, Beachwood, OH (US); Jonathan Meyer, Beachwood, OH (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

(21) Appl. No.: 17/909,518

(22) PCT Filed: Jun. 10, 2021

(86) PCT No.: PCT/US2021/036842
§ 371 (c)(1),
(2) Date: Sep. 6, 2022

(87) PCT Pub. No.: WO2021/252783
PCT Pub. Date: Dec. 16, 2021

(65) Prior Publication Data
US 2023/0119599 A1     Apr. 20, 2023

Related U.S. Application Data

(60) Provisional application No. 63/037,339, filed on Jun. 10, 2020.

(51) Int. Cl.
*A01G 7/04* (2006.01)
*F21S 4/28* (2016.01)
(Continued)

(52) U.S. Cl.
CPC ............ *A01G 7/045* (2013.01); *A01G 9/249* (2019.05); *F21S 4/28* (2016.01); *F21V 5/04* (2013.01);
(Continued)

(58) Field of Classification Search
CPC . A01G 7/045; A01G 9/249; F21S 4/28; F21V 5/007
See application file for complete search history.

(56) References Cited

U.S. PATENT DOCUMENTS 9,951,941 B2 * 4/2018 Klase ...................... F21V 19/02
10,215,385 B2    2/2019 Klase et al.
(Continued)

OTHER PUBLICATIONS

Copy of International Search Report and Written Opinion dated Sep. 15, 2021 which was issued in connection with PCT/US2021/036842.

*Primary Examiner* — Tracie Y Green
*Assistant Examiner* — Michael Chiang
(74) *Attorney, Agent, or Firm* — Buckley, Maschoff & Talwalkar LLC

(57) ABSTRACT

A horticultural lighting fixture including a light bar including a plurality of solid state light sources arranged in a linear array along a longitudinal axis of the light bar; and a light bar support structure that couples with the light bar to support the light bar in a fixed spaced relationship with the light support structure, the light bar support structure including at least two fasteners at opposing terminal ends of the light bar support structure to attach to a vertical support.

18 Claims, 18 Drawing Sheets

(51) Int. Cl.
  *F21V 5/04*    (2006.01)
  *F21V 13/04*   (2006.01)
  *G02B 27/09*   (2006.01)
  *A01G 9/24*    (2006.01)
  *F21Y 113/13*  (2016.01)
  *F21Y 103/10*  (2016.01)
  *F21Y 115/10*  (2016.01)
  *F21V 5/00*    (2018.01)

(52) U.S. Cl.
  CPC .......... *F21V 13/04* (2013.01); *G02B 27/0927* (2013.01); *F21V 5/007* (2013.01); *F21Y 2103/10* (2016.08); *F21Y 2113/13* (2016.08); *F21Y 2115/10* (2016.08)

(56) References Cited

U.S. PATENT DOCUMENTS

| | | |
|---|---|---|
| 10,485,187 B2 | 11/2019 | Klase et al. |
| 2005/0005529 A1* | 1/2005 | Brault .................. A01G 9/24 52/63 |
| 2006/0198146 A1* | 9/2006 | Lippis .................. F21V 15/01 362/277 |
| 2015/0351325 A1* | 12/2015 | Shelor .................. H05B 47/105 47/58.1 LS |
| 2018/0084733 A1 | 3/2018 | Adams et al. |
| 2018/0283656 A1* | 10/2018 | Gommans ............... F21V 11/06 |
| 2018/0347789 A1* | 12/2018 | Moore .................. F21V 21/005 |
| 2019/0327908 A1* | 10/2019 | Goettle ............... F21V 23/0442 |
| 2020/0060103 A1 | 2/2020 | Klase et al. |

\* cited by examiner

700

| Manuf. A-6" above Crop | Inches | | | | |
|---|---|---|---|---|---|
| | 0 | 6 | 12 | 18 | 24 |
| Inches | | | | | |
| 0 | 84.9 | 100.7 | 107.9 | 101.5 | 80.3 |
| 6 | 194.3 | 232.2 | 260.1 | 239.6 | 168.1 |
| 12 | 226.2 | 269.9 | 297.5 | 274.0 | 200.4 |
| 18 | 244.8 | 284.6 | 311.5 | 284.5 | 215.7 |
| 24 | 245.4 | 283.8 | 306.6 | 279.4 | 218.1 |
| 30 | 248.9 | 290.2 | 310.8 | 278.0 | 220.3 |
| 36 | 240.4 | 287.9 | 305.8 | 274.2 | 223.3 |
| 42 | 234.9 | 280.1 | 296.5 | 264.6 | 215.5 |
| 48 | 170.0 | 201.8 | 211.8 | 191.0 | |
| 51 | | 114.1 | 124.7 | 124.7 | |

| Manuf. A | Edge-Edge | | | Center | | | E-E uniformity | Center-Uniformity |
|---|---|---|---|---|---|---|---|---|
| Ht | Avg | Min | Max | Avg | Min | Max | | |
| 4.5 | 221 | 51 | 347 | 295 | 236 | 347 | 0.27 | 0.80 |
| 6 | 235 | 80 | 312 | 282 | 232 | 312 | 0.36 | 0.82 |
| 8 | 222 | 95 | 289 | 266 | 214 | 289 | 0.43 | 0.81 |

| Ht above Plant | Average PPFD EDGE-EDGE | Minimum PPFD EDGE-EDGE | Center | Max PPFD EDGE-EDGE | Uniformity EDGE-EDGE | Center |
|---|---|---|---|---|---|---|
| 6 | 289 | 195 | 307 | 347 | 0.68 | 0.93 |
| 8 | 281 | 177 | 245 | 349 | 0.63 | 0.84 |

| Reflector | PPFD | | | Uniformity | |
|---|---|---|---|---|---|
| | Avg | Min | Max | Min/Max | Min/Avg |
| NO | 653 | 325 | 844 | 38 | 50 |
| YES | 860 | 509 | 1098 | 46 | 59 | ial depictions in this context.

LIGHT SOURCE SYSTEM FOR HORTICULTURE APPLICATIONS

BACKGROUND

Embodiments of the present disclosure generally relate to a lighting system, and more particularly relate to a lighting system that can efficiently and flexibly provide uniform illumination in horticulture and other applications.

Indoor farming or horticulture may typically involve growing plants in one or more containers or pots arranged on shelves of a cart, where the cart may typically include multiple shelves. FIG. 1 is an illustrative depiction of a "grow cart" 100 having multiple shelves (e.g., 105 and 110). Grow cart 100 may have a number of vertical supports 115, 120, 125, and 130 to which the shelves may be attached, either fixed or removably. Shelves attached to the supports of the grow cart provide a stable horizontal surface (e.g., 135) onto which one or more containers or pots housing plants can be placed. In some applications, the style of grow cart depicted in FIG. 1 is often used in indoor farms and has a layer of plants growing on each shelf. The plants might grow on the carts from seedling through full growth phases. In some embodiments, grow cart 100 may have wheels, rollers, or other mechanisms that facilitate easy movement and/or repositioning of the grow cart in and out of an indoor farming facility or to various different locations within the facility based on, for example, a growing phase for the plants on the grow cart.

A major concern of indoor farming is providing the requisite environment in a consistent manner to grow the plants therein in an efficient and sustainable manner. Various aspects related to the growth and viability of the plants must be provided and accounted for, including, for example, the required lighting, watering, feeding of nutrients, temperature and humidity (i.e., environmental) controls, etc. that promote healthy plant growth. Regarding the lighting of plants in indoor farming or horticulture, a key aspect is providing plants of the indoor farm with a consistent source of light, sufficient to support and encourage optimal plant growth. The arrangement of plants on grow carts may present some challenges to adequately and sufficiently lighting plants in an indoor farming application.

Therefore, it is desirable to provide a lighting system to address one or more of the above-mentioned situations.

BRIEF DESCRIPTION OF THE DRAWINGS

The accompanying drawings, which are incorporated herein and form part of the specification, illustrate the present disclosure and, together with the description, further serves to explain the principles of the disclosure and to enable a person skilled in the relevant art(s) to make and use the disclosure.

FIG. 7 is an illustrative table of measurements, in accordance with aspects described herein;

FIG. 8 is an illustrative table of another set of measurements, in accordance with aspects described herein;

FIGS. 14A and 14B are illustrative depictions of another refractive optic design, in accordance with aspects described herein;

FIG. 18 is an illustrative table of still another set of measurements, in accordance with aspects described herein;

FIGS. 19A-9C are illustrative depictions of a refractive optic design and light distributions therefrom, in accordance with aspects described herein;

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

The present disclosure relates to a lighting system that might find applications(s) in the context or environment of indoor horticulture or farming, though not limited thereto. In the context of an indoor farming environment, the growing environment might include one or more rows of grow carts rolled in between and/or against vertical supports that may fixed to the floor and/or ceiling (or other fixture). In some embodiments, one or more light bars may be mounted to these vertical supports at, for example, regular intervals that correspond to the shelves of the grow carts positioned adjacent or nearby such that, when a grow cart is positioned into position near the light bar(s), each shelf will have a light bar supplying light to the plants on that shelf.

As used herein, a "light bar" refers to a longitudinally configured lighting device that emits light along a longitudinal axis extending over at least a portion of a length of the device, where one or more individual sources of light (e.g., light emitting diodes (LEDs) or other solid state lighting devices) might be arranged along the longitudinal axis of the device to provide illumination over substantially a complete or nearly a complete, end-to-end, length of the light bar. In some embodiments, the sources of light comprising a light bar herein might be LEDs or other solid state lighting devices, although other sources of light might be used in some instances, unless otherwise stated or restricted when combined with other components and design considerations disclosed herein.

Figure 1:
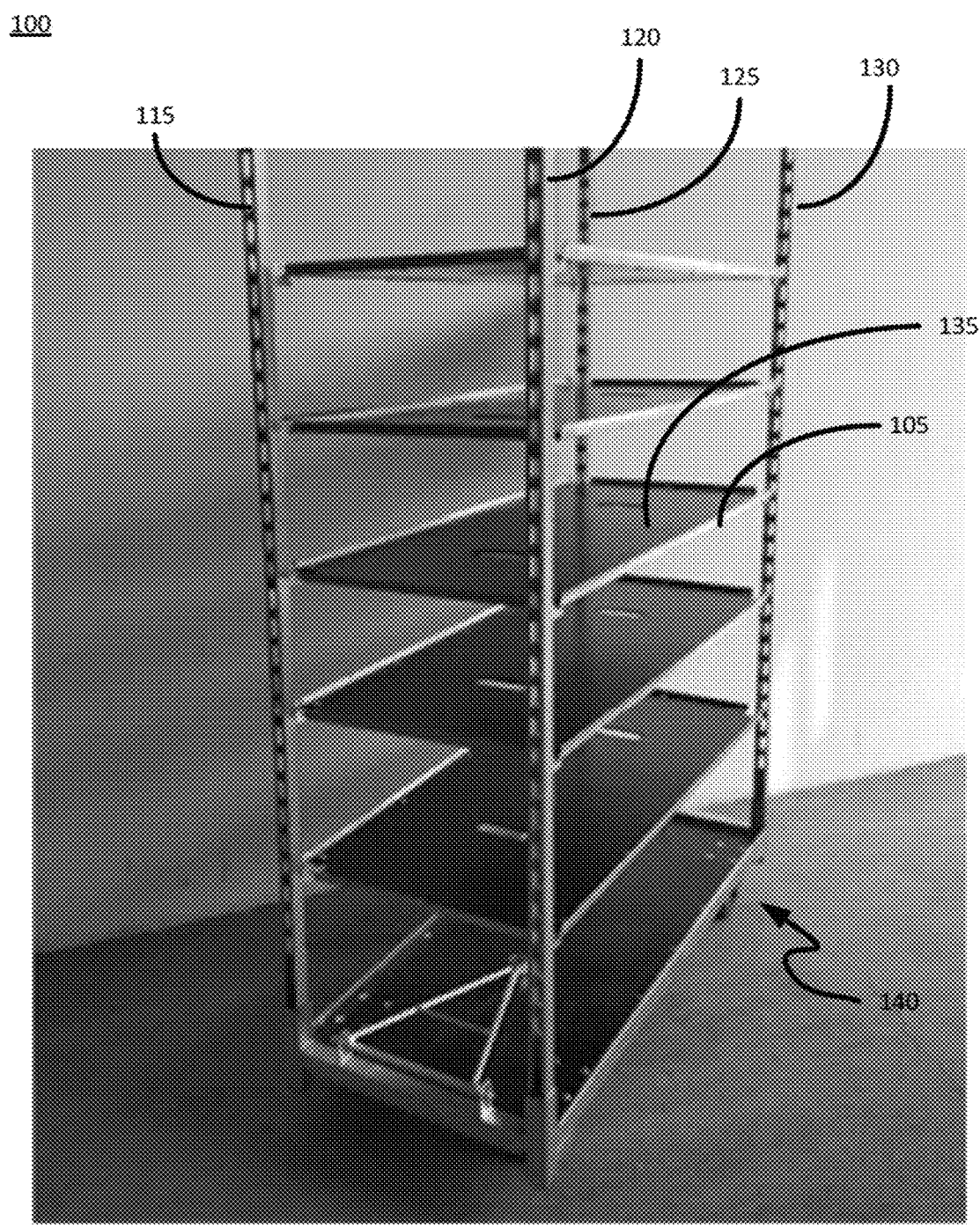
FIG. 1 is an illustrative depiction of a grow cart.
Figure 2:
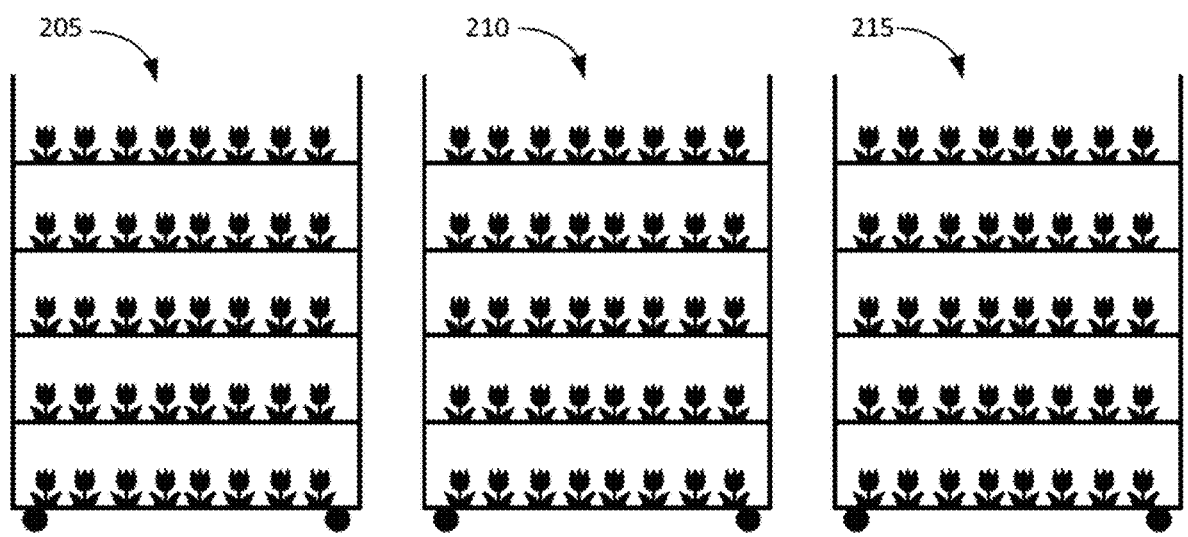
FIG. 2 is an illustrative depiction of a grow cart having plants arranged on the shelves of the grow cart.
Figure 3:
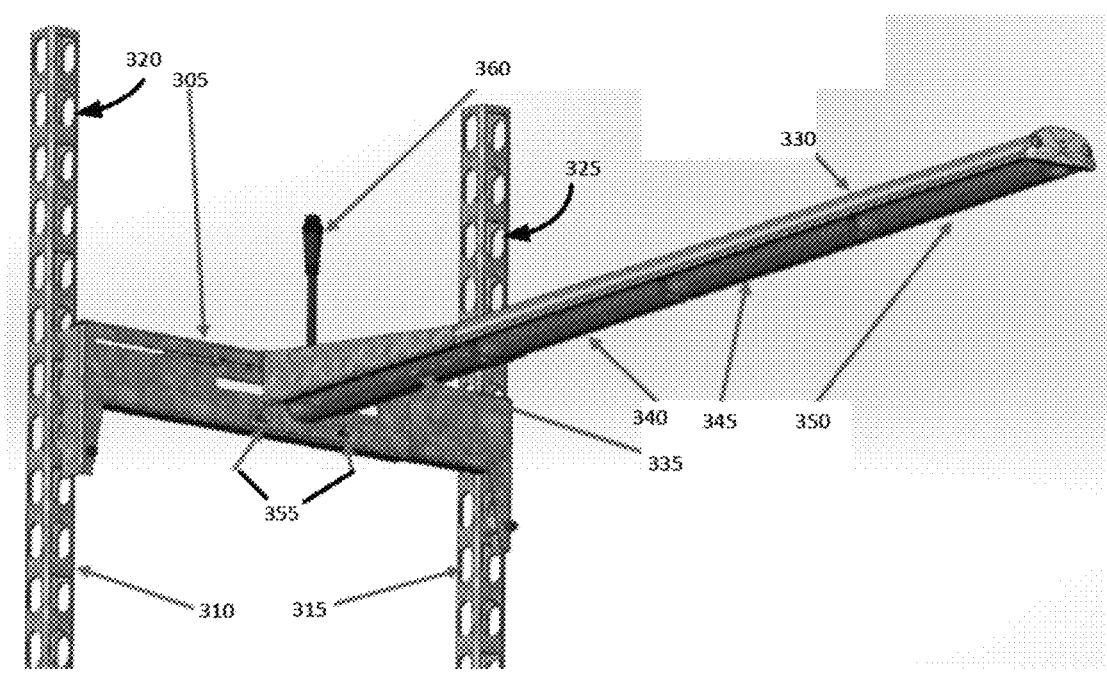
FIG. 3 is an illustrative depiction of a light bar system including a light bar support structure, in accordance with aspects described herein.

FIG. 2 is an illustrative depiction of a plurality of grow carts 205, 210, and 215 each having a number of plants located on the shelves of the grow carts. The grow carts 205, 210, and 215 might comprise a portion of one row of grow carts in an indoor grow facility that can house multiple rows (e.g., dozens or even hundreds) of grow carts arranged in various configurations that might include one, two, three, or more (e.g., dozens or even hundreds) grow carts in each row In some aspects, the grow carts of FIG. 2 might be positioned near or adjacent to one or more light bars such that the plants on the shelves of the grow carts can receive light emitted from the light bars. In some embodiments, as illustrated in FIG. 3, a light bar lighting system 300 herein might comprise a light bar support structure 305 that can be mounted to existing vertical supports 310 and 315 in an indoor farm. Supports 310 and 315 might be constructed of Unistrut™ or similar style (e.g., steel) bars or supports that might include regularly spaced cutouts or openings (e.g., 320, 325). In some aspects, light bar support structure 305 has hooks that match the spacing of the cutouts in the vertical supports. These hooks or other mating fasteners are used to attach the light bar support structure to vertical supports 310 and 315. FIG. 3 further includes adjusters 355 (e.g., set screws) that may be loosened or otherwise adjusted to permit the adjustment or variance of a relative angle between a light bar 330 supported by light support structure 305 and a support surface of a shelf of a grow cart (not shown in FIG. 3). The adjusters 355 may be tightened or otherwise adjusted to prevent further adjustment or variance of the relative angle between light bar 330 and the support surface of a shelf of the grow cart (i.e., the planar, horizontal surface of a grow cart shelf) once the light bar has been moved to the desired angle. In some embodiments, the light bar might be varied ±5 degrees relative to a plane perpendicular to a shelf of a grow cart (i.e., ±5 degrees relative to a plane perpendicular to a neutral position of the light bar). Light bar 330 may comprise one or more sections of LEDs, as shown at 335, 340, 345, and 350. As also shown in FIG. 3, light support structure 305 may provide support for or an interface coupling for a light bar electrical supply cord and plug 360.

In some embodiments, the configuration of a light bar support structure disclosed herein facilitates and supports an easy adjustment of the height of a lightbar above the plane of a shelf of a grow cart. In some particular embodiments, the height of a light bar above plants using the light bar support structures disclosed herein can be varied from about 4 inches above the plane of a shelf of a grow cart to about two—four feet above the plane of the shelf of a grow cart.

Figure 4:
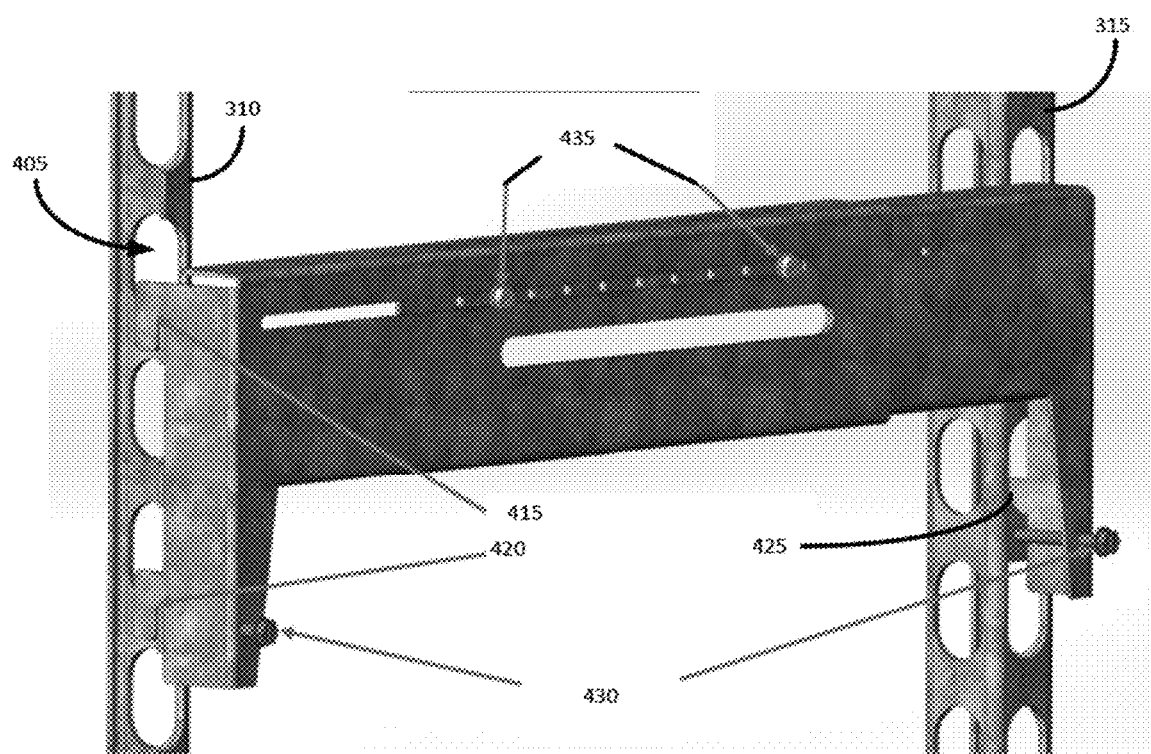
FIG. 4 is an illustrative depiction of a light bar support structure, in accordance with aspects described herein.

FIG. 4 illustrates additional details of the light support structure of FIG. 4. As shown in FIG. 4, light support structure 305 attaches to vertical supports 310 and 315 by hooks 415, 420, and 425 (another hook (not shown in FIG. 4) is located above hook 425 but is obscured in FIG. 4) that mate with openings or apertures in the vertical supports at, for example, openings 405 and 410. A width of light bar support structure 305 can be adjusted to match the width between the vertical supports by loosening one or more screws (or other tightening mechanisms) 435 in the support structure, wherein the width of the support structure can be adjusted and then the screw(s) can be tightened to hold the width of the support structure at the desired width once the width corresponding to the distance between the vertical supports has been achieved. If desired, the light bar support structure 305 may be affixed, securely, to the vertical supports by tightening the set screw(s) 430 or other fastening or tightening mechanisms at the base of the light bar support structure. Set screws 430 may operate to physically press against the surface of the vertical supports to further prevent the support structure's hooks from disengaging with vertical supports 310 and 315. In some embodiments, light bar support structure 305 might be adjustable to vary the width between the opposing terminal ends of the light bar support structure, from about 12 inches to about 48 inches. In some other embodiments, the adjustable range for the width of the light support structure may be different.

Figure 5:
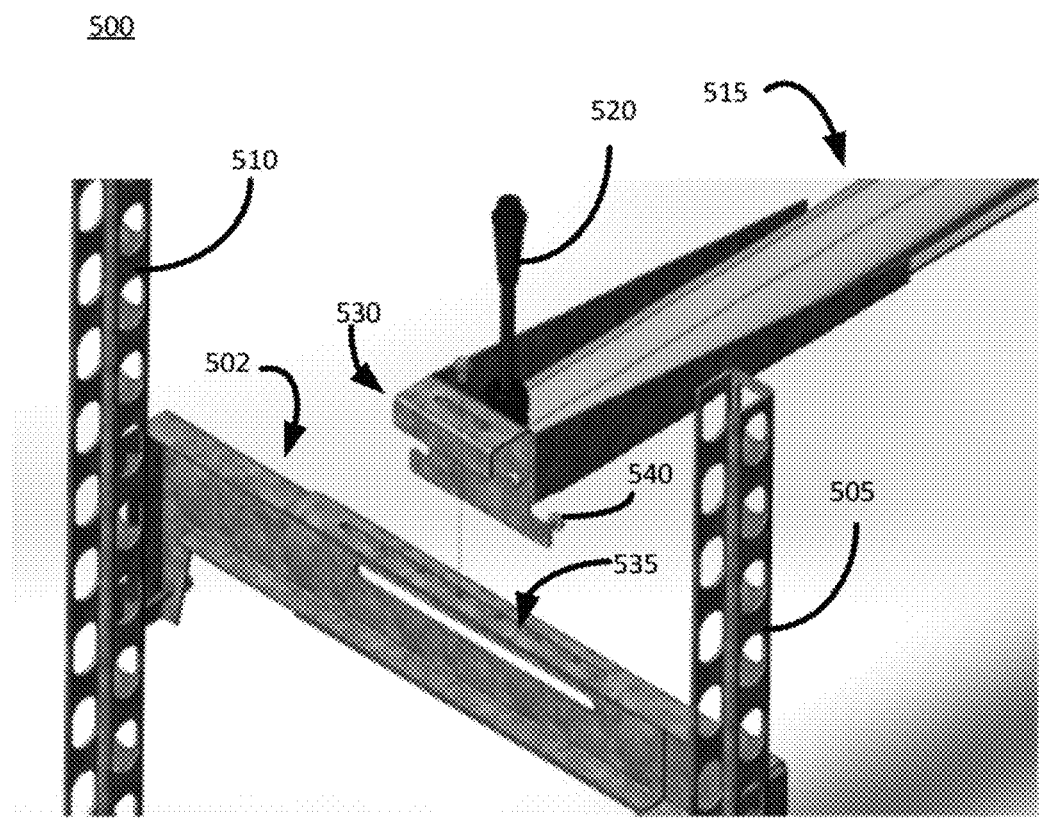
FIG. 5 is an illustrative depiction of a light bar support structure, including mounting details thereof, in accordance with aspects described herein.

FIG. 5 is an illustrative depiction of some detail aspects of a light bar support structure herein. In some embodiments, the system or device 500 in FIG. 5 might be the same as or at least compatible with some components of the light bar support systems of FIGS. 3 and 4. In some embodiments, after a light bar support structure 502 herein is attached vertical supports 505, 510 of an indoor farm, the light bar 515 can be hooked onto the support structure as shown in FIG. 5. In some embodiments, an electrical connection is provided between the light bar 515 and a electrical power supply via power supply cord and plug 520. In some embodiments, light bar 515 may be fixed in place on the light bar support 502 by, for example, one or more of gravity, a friction fitting between light bar 515 and the light bar support 502, magnetic couplings, a fastener (e.g., hook 530), and or other mechanisms. In the example of FIG. 5, hook 530 may be positioned into or otherwise engaged with slot 535. Set screw(s), such as set screw 540 may be used to further hold or affix the light bar against light bar support structure 502.

Figure 6:
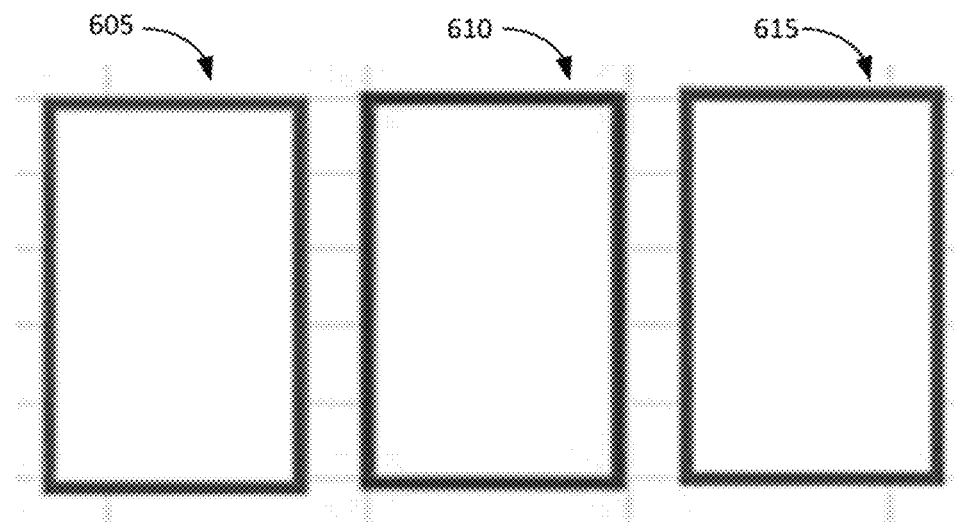
FIG. 6 is an illustrative depiction of a layout of grow carts, in accordance with aspects described herein.

In some environments and contexts, a typical layout for grow carts in horticulture applications may be as depicted in FIG. 6 that includes three (3) grow carts 605, 610, and 615. In the example of FIG. 6, each of the grow carts provide a grow area measuring about 24 inches by about 51 inches. In some configuration, adjacent grow carts might be arranged such that there is about 0-2 inches between them.

In some aspects, a uniformity, as well as surface photosynthetic photon flux density, PPFD (i.e., a measure of the amount of photosynthetic active radiation that arrives at a plant denoting the photosynthetically active photons impinging a given surface per second), may be measured for evaluation purposes on the middle cart 610, wherein a light source might be about six (6) inches above the plant surface. PPFD measurements will be used in some of the following disclosure to highlight the comparative effectiveness of different lighting systems discussed below.

FIG. 7 is an illustrative table of measurements, in accordance with some aspects herein. In particular, FIG. 7 includes a table 700 listing PPFD measurements for A commercially available fixture having three (3) Lambertian linear light source for an application as presented in FIG. 6 (i.e., three (3) Lambertian linear light sources above each rack). Table 700 lists the PPFD measurements, demonstrating uniformity of the light distribution in such an arrangement. Note that in the present example, a target (i.e., optimal) PPFD measurement is about 300 for the configuration of 3 Lambertian light sources per cart. As seen in table 700, many regions of the grow surface have PPFD measurements lower than optimal PPFD measurement of 300, especially near the edges. In FIG. 7, region 705 is arbitrarily defined as the center of the cart and the surrounding, Edge-Edge region is denoted by reference numeral 710. Together, regions 705 and 710 encompasses the entire cart. Table 700 includes measurements PPFD calculations for both regions. As seen in FIG. 7, the PPFD measurements decrease dramatically outside of the center of the cart.

FIG. 8 includes PPFD and uniformity measurement results for this example system for various heights, as shown in table 800. As seen in table 800, while the PPFD measurements and uniformity in the center of the cart might approach, meet, or exceed the target measurement, the measurements in the Edge-Edge region are drastically lacking. The measured results show that for the entire grow surface, the Lambertian light source is inadequate for providing uniform light levels. For example, the uniformity is 36% at a 6 inch height, which is quite low. In this scenario, most plant varieties at the edge of the carts will not thrive.

In some embodiments herein, problems (including but not limited to those) noted in the above example may be addressed by a holistic approach as disclosed in some aspects herein. In some embodiments, modeled solutions have been realized using a combination of refractive optics and LED MCPCB (metal core printed circuit board) arrangements (although other technologies might be used in some embodiments) to significantly improve upon the results of FIGS. 7 and 8.

Figure 9A:
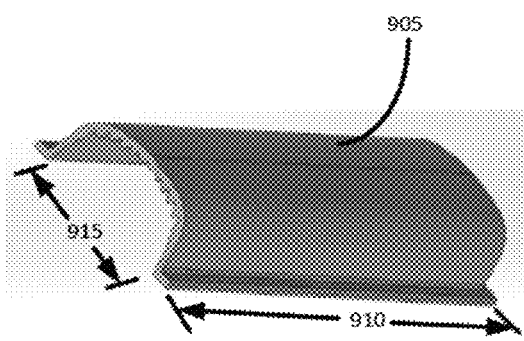
FIGS. 9A-9D are illustrative depictions of a refractive optic design and light distributions therefrom, in accordance with aspects described herein.
Figure 9B:
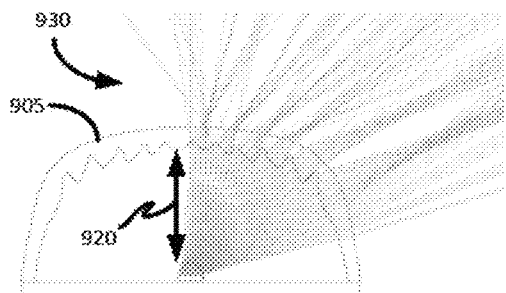
Figure 9C:
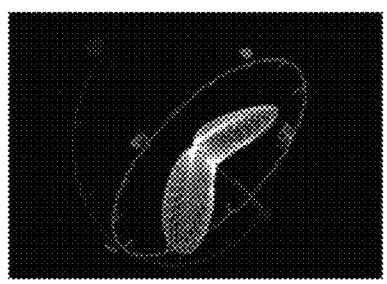
Figure 9D:
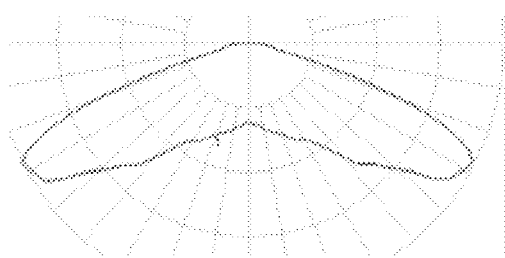

In one embodiment, a first refractive optic design 905 is shown in FIGS. 9A and 9B. Refractive optic 905 has a longitudinal length 910 that is much greater than its width 915. In the example of FIG. 9B, refractive optic 905 is positioned at a distance 920 of about 20 mm from the LED's 925 (only one LED shown in the view of FIG. 9B). Refractive optic 905 functionally operates to substantially bend the light from the Lambertian LED's, as shown at 930. As further demonstrated in FIGS. 9C and 9D, refractive optic 905 bends a large number of the Lambertian rays from the LEDs covered by refractive optic 905 to a batwing light distribution. In some embodiments, a lighting fixture herein might include a first refractive optic that provides a batwing with a peak maxima of intensity at a minimum of about 50 to 60 degrees.

Figure 10:
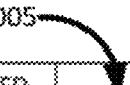
FIG. 10 is an illustrative table of a set of measurements, in accordance with aspects described herein.

FIG. 10 is an illustrative table of a set of simulation result measurements for grow carts configured as arranged in FIG. 6 and illuminated with light bars having refractive optics as disclosed in FIGS. 9A and 9B. Referring to FIG. 10, table 1000 clearly shows that the PPFD and uniformity measurements are significantly better when using light bars with the refractive optics of FIGS. 9A and 9B, as compared with the those of the Lambertian refractive optic results shown in FIG. 8. The improvements are especially significant in the Edge-Edge region as shown at column 1005 in FIG. 10.

Figure 11:
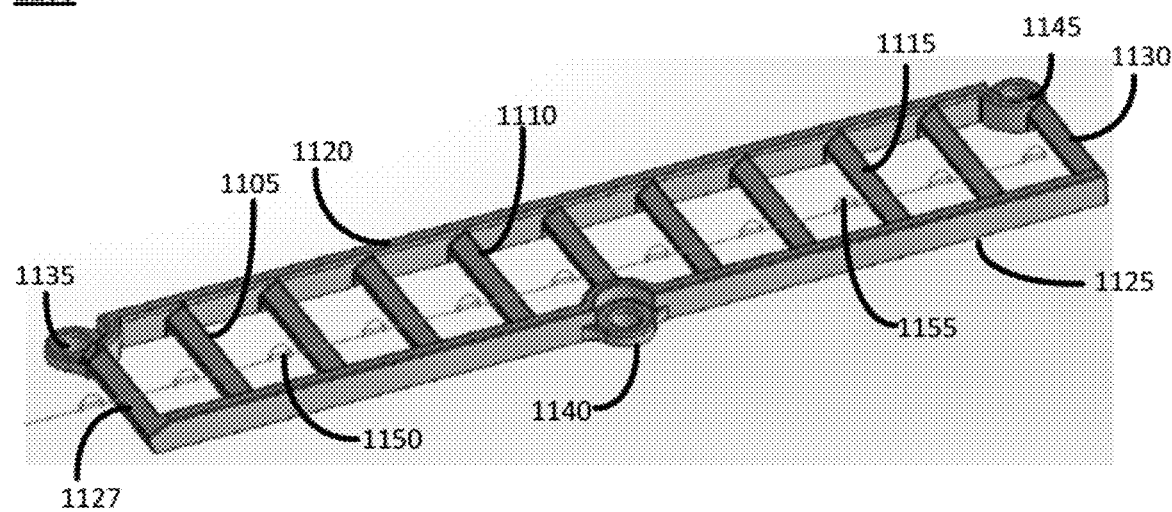
FIG. 11 is an illustrative depiction of a refractive optic design, in accordance with aspects described herein.

In another embodiment, another (second) refractive optic 1100 of the present disclosure is shown is shown in FIG. 11. Refractive optic 1100, also referred to herein as a first louvre refractive optic, includes a number of refractive optics (e.g., 1105, 1110, and 1115) disposed between and supported by a side support rails 1120 and 1125 and end support rails 1127 and 1130. The support rails may include a number of mounting couplings or openings (e.g., 1135, 1140, and 1145) that facilitate attaching refractive optic 1100 in corresponding alignment with light sources arranged in a linear layout (e.g., a light bar with linearly arranged LEDs such as, for example, LEDs 1150 and 1155), as shown in FIG. 11.

Figure 12:
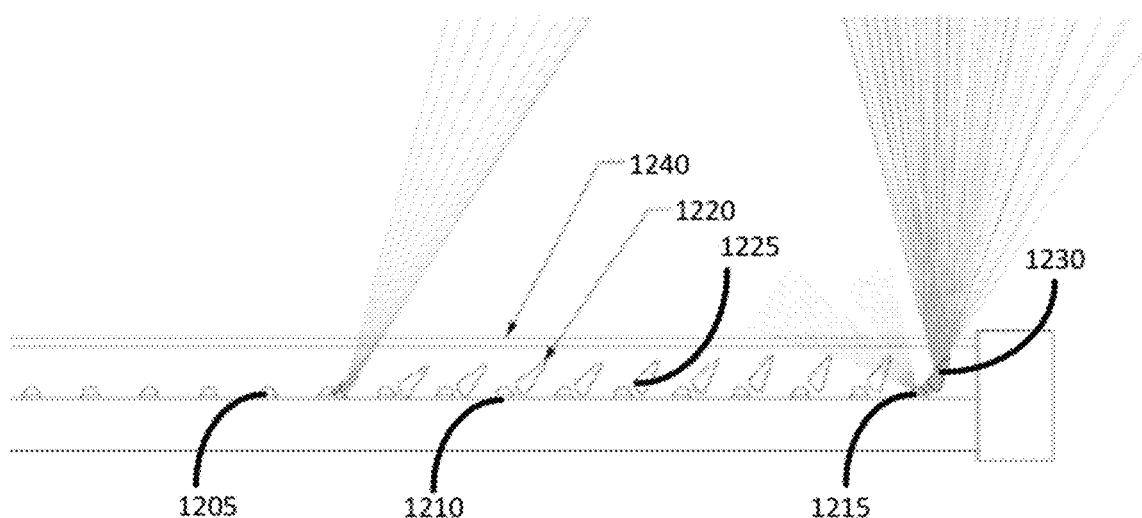
FIG. 12 is an illustrative depiction of the refractive optic design of FIG. 10 with illustrative light rays reflected and/or reflected thereby, in accordance with aspects described herein.

Referring to FIG. 12, a lighting system 1200 is shown that includes a number of LEDs (e.g., 1205, 1210, and 1215) arranged in a linear configuration, an refractive optic including a number of refractive optic components 1220, 1225, and 1230, and a cover lens 1240. In some embodiments, the individual refractive optic components of FIG. 12 might be attached, integrated with, or otherwise affixed to the MCPCB board supporting a linear layout of LEDs, in close proximity to the LED's. The typical distance between LED's is 10 mm, and the refractive optic can be within 1-3 mm. In some embodiments, the generally "ladder-like" design of refractive optic 1100 and system 1200 might allow for precise placement of the refractive optic adjacent to the LED's.

In some aspects, a function of the refractive optic in FIGS. 11 and 12 is to redirect the light directed to the right of an LED (e.g., 1215) back towards a central grow area using refraction and total internal reflection. As shown in FIG. 12, refractive optic component 1230 redirects light rays initially directed to a right side of the LED adjacent thereto back towards a central location. It is further seen that the light going left of the LED passes through the neighboring louver with minimal impact.

Figure 13:
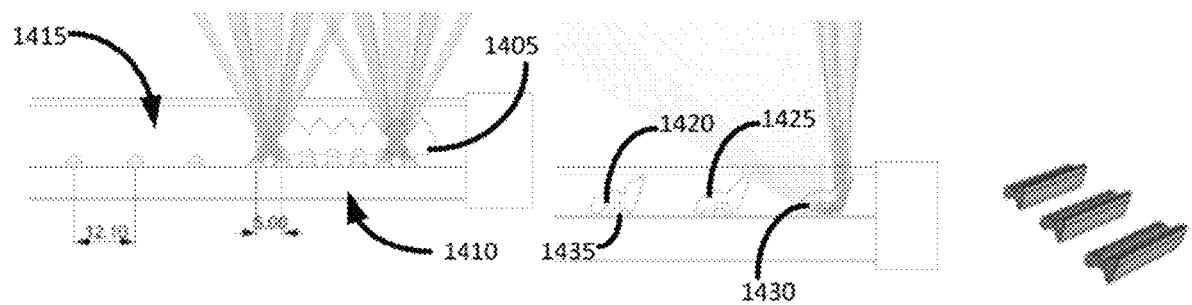
FIG. 13 is an illustrative table of yet another set of measurements, in accordance with aspects described herein.

FIG. 13 is an illustrative table 1300 of a set of simulation result measurements for grow carts configured as arranged in FIG. 6 and illuminated with light bars combined with the first refractive optic disclosed in FIGS. 9A and 9B and the second refractive optic as disclosed in FIGS. 11 and 12. Referring to FIG. 13, we note an improvement with the secondary refractive optic for uniformity, beyond even the measurement results of FIG. 10 for first refractive optic (i.e., FIGS. 9A and 9B) alone. Additionally, table 1300 shows an almost doubling of the measurement results for Edge-Edge uniformity, as compared to the original Lambertian source shown in table 800 in FIG. 8.

In accordance with the present disclosure, other types of refractive optics might be used in some embodiments and configurations, within the scope of the present disclosure. These other types of refractive optics might be implemented in combination with one or more aspects of the refractive optics disclosed hereinabove. For example, FIGS. 14A and 14B disclose refractive optics disposed in close proximity, within 1 mm-3 mm, to linearly arranged LEDs. FIG. 14A includes a lighting system including refractive optic 1405 in adjacent proximity to LEDs in a region 1410, where the spacing between LEDs in the region 1410 is smaller than the spacing between LEDs in region 1415 to boost light levels in the end region area. The LEDs in the region 1410 may be located near an end of the linear layout or array of the LED's. FIG. 14B includes a lighting system including refractive optic components 1420, 1425, and 1430 each in adjacent proximity to individual LEDs (e.g., refractive optic component 1420 and LED 1435). In some aspects, the refractive optics in FIGS. 14A and 14B functionally operate, similar to the refractive optics in FIGS. 11 and 12, to redirect light from the LED's, at least partially, towards a center area illuminated by the LEDs. The internally mounted refractive optics configuration of FIG. 14B might be implemented to cover, for example, 10 LEDs at the ends of a lighting fixture. As shown in FIG. 14B, light to the right of an LED is redirected up, wherein the refractive optic pushes light to the right up so that it misses the neighboring refractive optic.

In some aspects, the refractive optics designs disclosed in FIGS. 14A and 14B might function to improve the Edge-Edge uniformity by about 10%, compared to a Lambertian refractive optic design.

In some embodiments, a significant part of the design effectiveness of a lighting system in accordance with some aspects herein might be gained based on the LED layout. As such, the present disclosure includes a number of different LED layout designs that might be implemented in one or mere embodiments.

Figure 15:
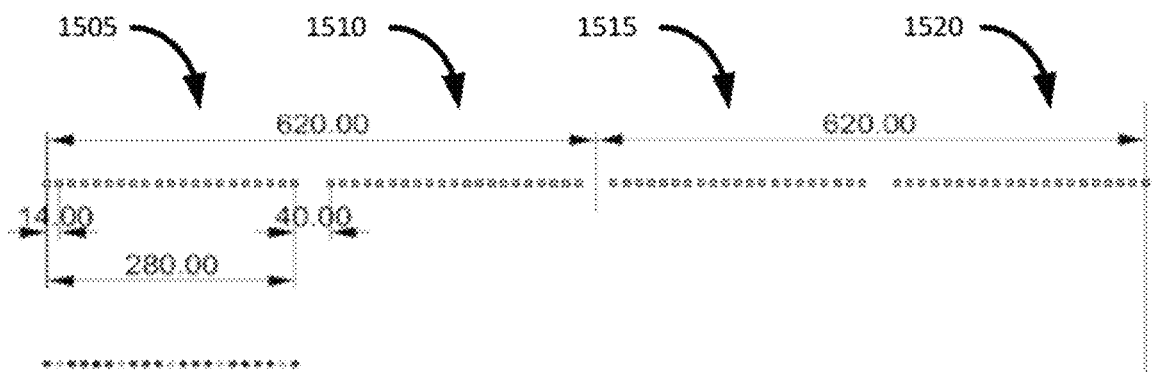
FIG. 15 is an illustrative layout of LEDs of a refractive optic design, in accordance with aspects described herein.

In some embodiments, a LED layout in accordance with some aspects herein might include the LED layout illustratively depicted in FIG. 15. As shown, this example LED layout includes four (4) clusters of LEDs 1505, 1510, 1515, and 1520, spaced as indicated by the measurements included in FIG. 15 (where the unit of measurement is millimeters).

The four (4) clusters of LEDs may comprise red (R), blue (B), Green (G), and white (W) LEDs. In some embodiments, while FIG. 15 shows a set of four LED clusters, the number of clusters in some embodiments might be increased or decreased to as many clusters as needed for a particular implementation. In some aspects, the distribution and sequencing of the R, B, G, W, LED's per cluster will ensure no color separation.

Figure 16:
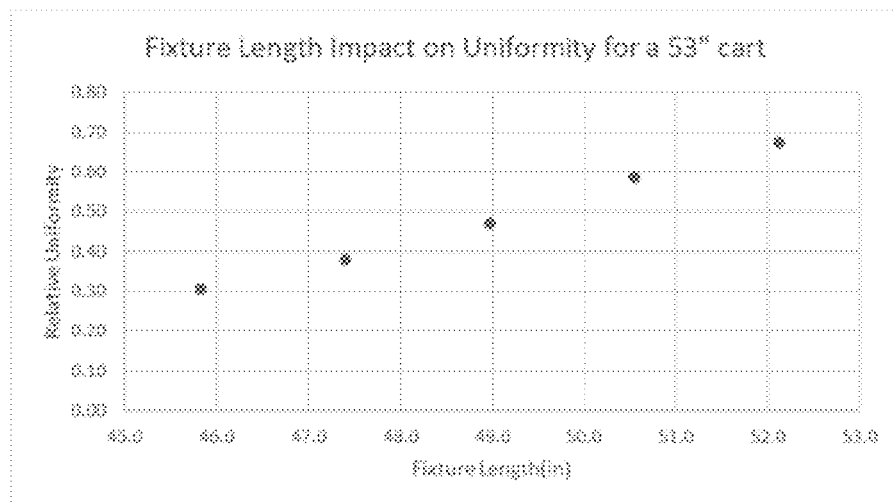
FIG. 16 is an illustrative table of measurements, in accordance with aspects described herein.

A simulation (e.g., modeling and analysis) has been performed with a varying length of the lightbar with reference to length of grow surface. Some results of the executed simulation are shown in FIG. 16. As shown in FIG. 16, there is a 58% improvement in uniformity if the length of lightbar reaches an optimal length with reference to length of grow table.

Figure 17:
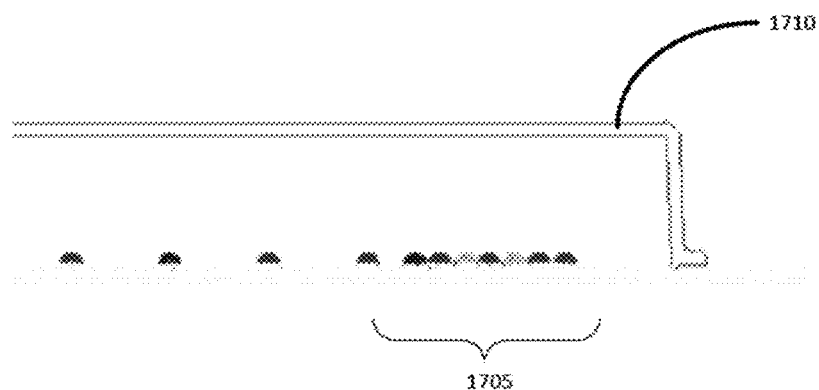
FIG. 17 is an illustrative depiction of a layout of LEDs and a refractive optic design, in accordance with aspects described herein.

In some aspect, a significant impact to uniformity might be achieved by clustering LED's near the end of the light bars. This is especially the case of the lightbar length is significantly less than the length of the grow surface. An example of this clustering is shown in FIG. 17 at region 1705.

Figure 18:
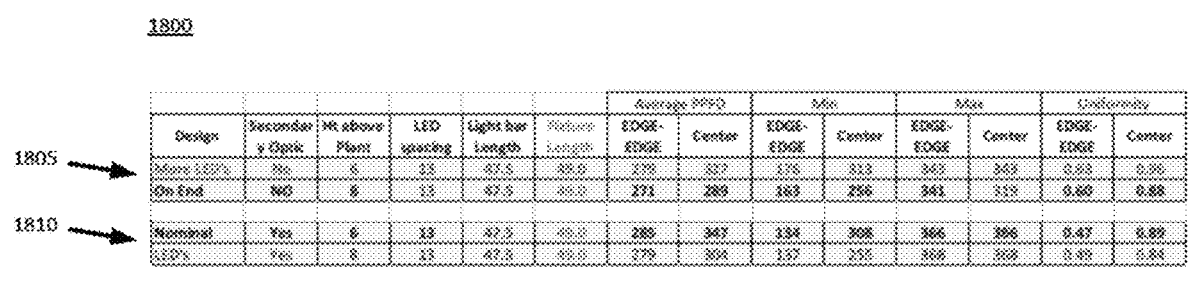

A simulation was conducted for a lighting system having more LED's on the end (e.g., region 1705) and the refractive optic of FIGS. 9A and 9B (e.g., refractive optic 1710). Some of the measurement results of this simulation are listed in table 1800 of FIG. 18. Table 1800 includes measurement results with the (first) refractive optic of FIGS. 9A and 9B and LEDs clustered at the end at 1805 and measurement results with nominal (i.e., uniform) spacing and the (first) refractive optics of FIGS. 9A and 9B and the (second) refractive optics of FIGS. 11 and 12 at 1810. As seen, the clustering of LEDs near the end of the lighting system can dramatically increase the Edge-Edge uniformity measurement values. For example, there is a 34% improvement on Edge-Edge uniformity with clustered LED's, using only the (first) refractive optic. Such results indicate that implementations using this configuration might yield a significant cost savings from material and labor for short throws.

Figures 19A, 19B, 19C:
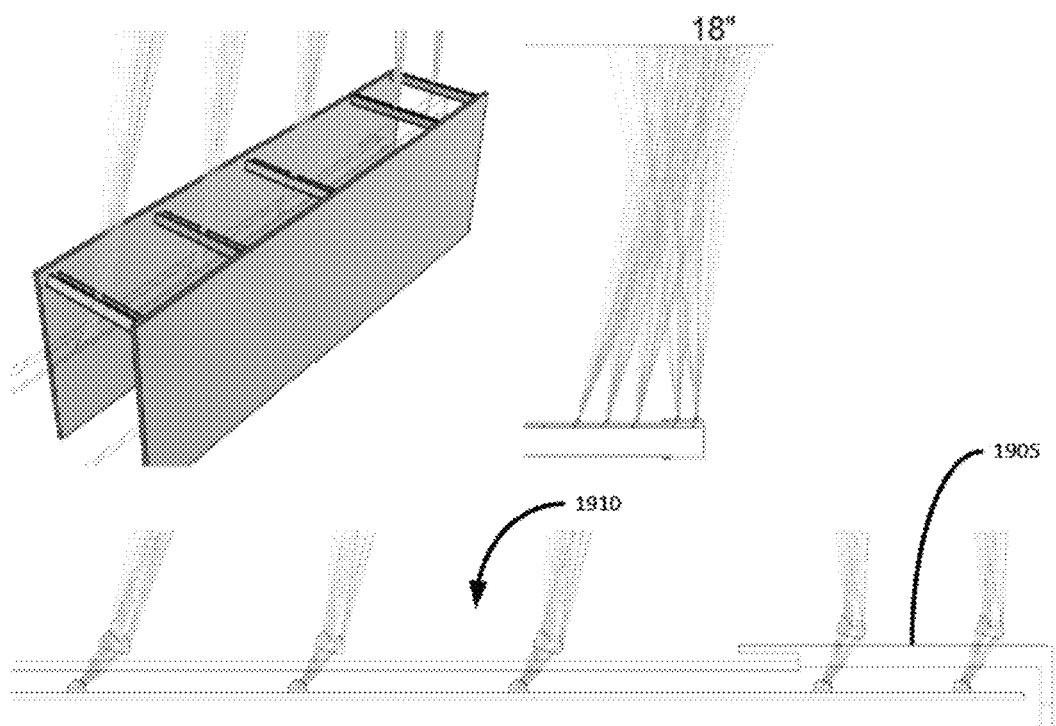

In some embodiments, the present disclosure incudes a clip-on lens (constructed of polycarbonate, for example) that might snap over either end of a lighting fixture and redirects missed light from about the last five (5) or six (6) LEDs toward the edge. FIGS. 19A-19C show an example of a clip-on lens. Fresnel refractive optics 1905 cross over the top of fixture 1910 and may be attached to side walls that might be used to locate and snap onto the fixture. In some embodiments, a clip-on lens may be designed so that most of the water runs off of the refractive optics and any remaining drops of water will not impact performance. The predicted light distribution for the example of FIG. 19 is shown in FIGS. 19A-19C.

Figures 20A, 20B:
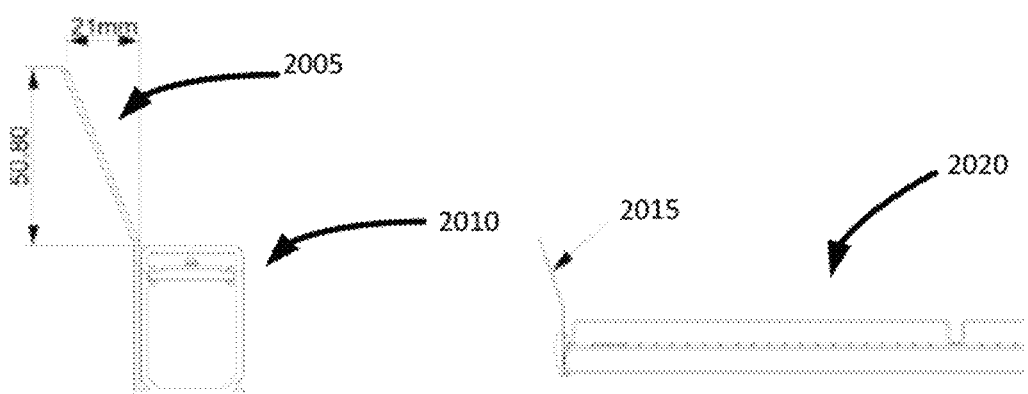
FIGS. 20A and 20B are each illustrative depictions of a refractive optic design including a reflector, in accordance with aspects described herein.

In some embodiments, a reflector might be added be added to a light bar in a lighting system herein, along the length of a lightbar and/or at the ends thereof. In some instances, a reflector might comprise a plastic extruded reflector that may be affixed to the light bar or in close proximity thereto to increase illuminance at the edges. Shown in FIGS. 20A and 20B are two reflector arrangements, where FIG. 20A includes a reflector mounted along a length of light bar 2010 and FIG. 20B includes a reflector 2015 mounted at the edge of light bar 2020. In some embodiments, these reflectors can be specular or non-specular. In some aspects, the reflectors of FIGS. 20A and 20B may not restrict air flow in and around the lighting fixture. In some embodiments, the reflectors might be 2 inches in height or less.

Figures 21A, 21B:
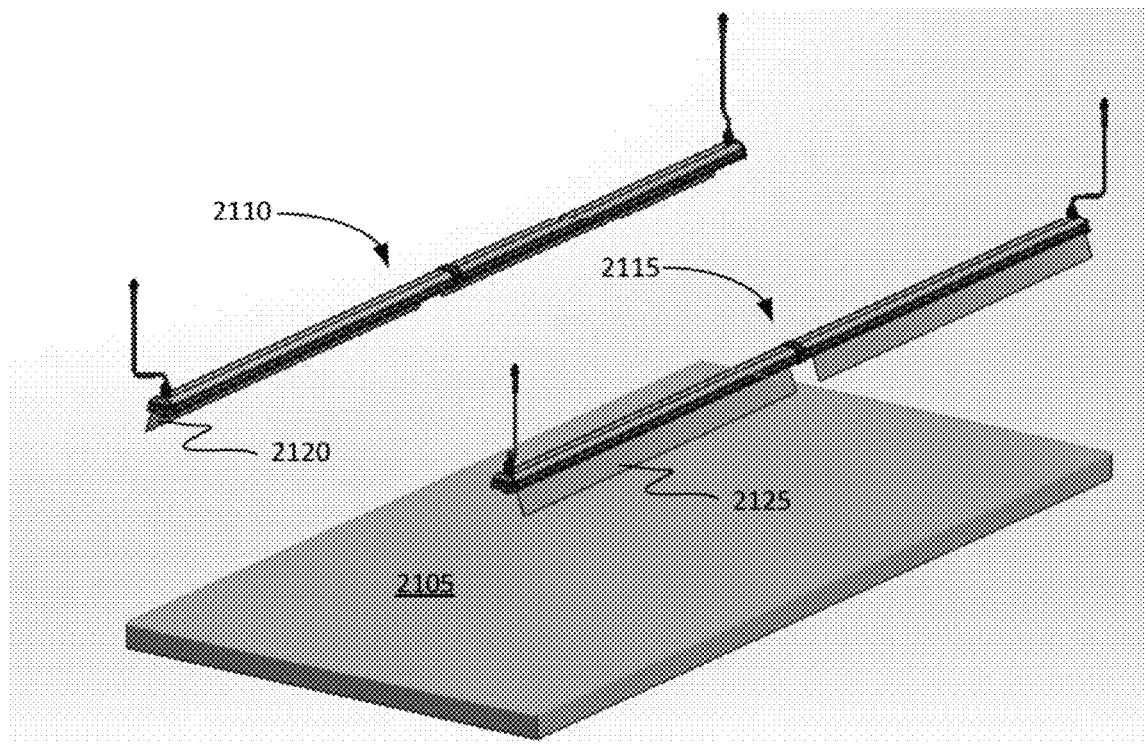
FIGS. 21A and 21B are illustrative depictions of measurement results and an embodiment of a lighting system, in accordance with aspects described herein.

In some embodiments, FIG. 21A is a tabular listing of measurement results for PPFD and light distribution uniformity for a lighting system or fixture including light bars with a length-wise reflector and a clip-on refractive optic device as shown in FIG. 21B. In the configuration of FIG. 21B, the grow table surface 2105 measures 4 feet×8 feet. The lightbars 2110 and 2115 are about 3 inches inwards from the longer edge of the grow table surface. In some embodiments, the position of the light bars in FIG. 21B may provide a maximum benefit. In some aspects, by positioning the light bars farther in from the edge of the grow surface, the reflectors 2120 and 2125 may prevent light from reaching the edge of the grow table surface.

Figure 22:
FIG. 22 is an illustrative graph of measurements, in accordance with aspects described herein.

As shown in FIG. 22, using refractive optics and/or reflectors at the ends of the lightbar near the edge of a cart can significantly improve the light distribution uniformity by taking light that might normally miss the cart and redirecting it toward the edge of the cart.

While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Figure 24:
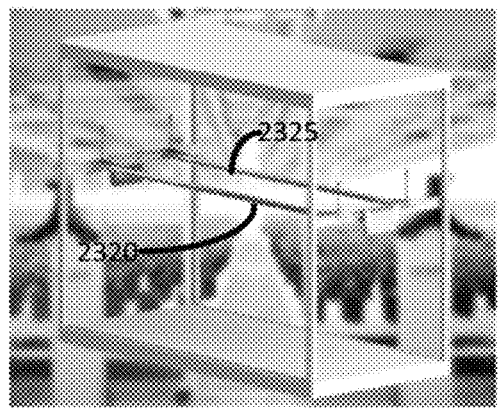
FIGS. 23 and 24 include illustrative configurations of light bar lighting systems, in accordance with aspects described herein.
Figure 23:
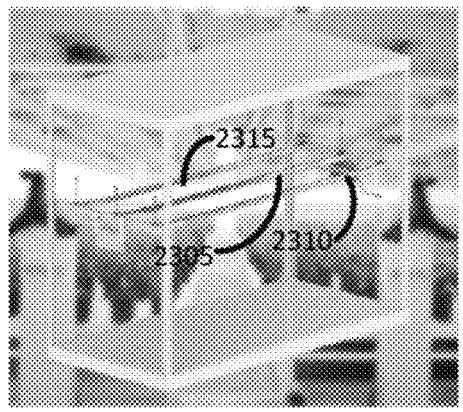

For example, two or more light bars might be configured in multiple different groupings, as illustrated in FIGS. 23 and 24. In FIG. 23, six (6) light bars are shown configured in a grouping of three (3) end-to-end light bar configurations (2 light bars each 2305, 2310, and 2315). FIG. 24 includes four (4) light bars configured in a grouping of two (2) end-to-end light bar configurations (2 light bars each 2320 and 2325).

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A horticultural lighting fixture comprising:
   a light bar including a plurality of solid state light sources arranged in a linear array along a longitudinal axis of the light bar;
   a light bar support structure that couples with the light bar to support the light bar in a fixed spaced relationship with the light support structure, the light bar support structure including at least two fasteners at opposing terminal ends of the light bar support structure to attach to a vertical support;
   a first refractive optic attached to the light bar in close proximity to the solid state light sources, the first optic converting Lambertian radiation emitted from the solid state light sources to a substantially batwing radiation distribution; and
   a second refractive optic that increases a photosynthetic photon flux density (PPFD) and uniformity at a surface illuminated by the solid state light sources, wherein the second refractive optic comprises a plurality of individual refractive optic components, each disposed in close proximity to one of the plurality of solid state light sources of the light bar.

2. The lighting fixture of claim 1, wherein the first refractive optic that increases a photosynthetic photon flux density (PPFD) and uniformity at a surface illuminated by the solid state light sources, as compared to the Lambertian radiation emitted from the solid state light sources in an absence of the first refractive optic.

3. The lighting fixture of claim 1, further comprising a reflector affixed to the light bar at least at one of a terminal end of the light bar and a longitudinal length of the light bar.

4. The lighting fixture of claim 3, wherein the reflector extends above a surface of the light bar less than about two (2) inches.

5. The lighting fixture of claim 1, wherein the plurality of individual refractive optic components are each disposed about 1 millimeter to about 3 millimeters in distance from one of the plurality of solid state light sources of the light bar.

6. The lighting fixture of claim 1, wherein the first refractive optic provides a batwing with a peak maxima of intensity at a minimum of about 50 to 60 degrees.

7. The lighting fixture of claim 1, wherein the light bar support structure is adjustable to vary a width between the opposing terminal ends of the light bar support structure, from about 12 inches to about 48 inches.

8. The lighting fixture of claim 1, wherein the light bar is selectively adjustable to vary an angle of the light emitted from the solid state light sources while maintaining the fixed spaced relationship between the light bar and the light support structure.

9. The lighting fixture of claim 8, wherein the light bar is selectively adjustable to vary the angle of the light emitted from the solid state light sources about ±5 degrees relative to a plane perpendicular to a neutral position of the light bar.

10. The lighting fixture of claim 1, wherein the solid state light sources comprise light emitting diodes, LEDs.

11. The lighting fixture of claim 10, wherein the LEDs comprise a combination of red, blue, white monochromatic LEDs.

12. The lighting fixture of claim 1, wherein the light bar support structure is adjustable to vary a width between the opposing terminal ends of the light bar support structure.

13. The lighting fixture of claim 1, wherein the light bar is removably coupled to the light bar support structure.

14. The lighting fixture of claim 1, wherein the solid state light sources are more densely spaced at least at one terminal end of the light bar relative to a spacing of the solid state light sources at locations other than the at least one terminal end.

15. The lighting fixture of claim 14, wherein the more densely spacing of the solid state light sources at least at one terminal end of the light bar relative to the spacing of the solid state light sources at locations other than the at least one terminal end increases a photosynthetic photon flux density (PPFD) and uniformity at a surface illuminated by the solid state light sources.

16. The lighting fixture of claim 1, wherein the light bar support structure includes at least two fasteners at opposing terminal ends of the light bar support structure to attach to a vertical support.

17. The lighting fixture of claim 16, wherein the at least two fasteners at opposing terminal ends of the light bar support structure removably attach to the vertical support.

18. The lighting fixture of claim 16, further comprising at least one set screw to secure the light bar support structure to the vertical support.

* * * * *